United States Patent
Bishop (10) Patent No.: US 8,421,805 B2
(45) Date of Patent: Apr. 16, 2013

(54) SMOOTH MORPHING BETWEEN PERSONAL VIDEO CALLING AVATARS

(75) Inventor: Wendell E. Bishop, East Falmouth, MA (US)

(73) Assignee: Dialogic Corporation, Montreal, Quebec (CA)

( * ) Notice: Subject to any disclaimer, the term of this patent is extended or adjusted under 35 U.S.C. 154(b) by 961 days.

(21) Appl. No.: 11/704,745

(22) Filed: Feb. 9, 2007

(65) Prior Publication Data
US 2007/0188502 A1    Aug. 16, 2007

Related U.S. Application Data

(60) Provisional application No. 60/771,732, filed on Feb. 9, 2006.

(51) Int. Cl.
*G06T 13/00* (2011.01)
*G06T 15/00* (2011.01)

(52) U.S. Cl.
USPC ............................................ 345/473; 345/646

(58) Field of Classification Search ........................ None
See application file for complete search history.

(56) References Cited

U.S. PATENT DOCUMENTS

| | | | | |
|---|---|---|---|---|
| 5,963,217 A * | 10/1999 | Grayson et al. | ............... | 345/473 |
| 6,272,231 B1 * | 8/2001 | Maurer et al. | ................. | 382/103 |
| 6,320,583 B1 * | 11/2001 | Shaw et al. | .................... | 345/619 |
| 6,614,466 B2 * | 9/2003 | Thomas | .................... | 348/14.13 |
| 6,661,418 B1 * | 12/2003 | McMillan et al. | ............ | 345/473 |
| 6,876,364 B2 * | 4/2005 | Buddemeier et al. | ......... | 345/473 |
| 7,023,454 B1 * | 4/2006 | Knight | ........................... | 345/646 |
| 7,168,953 B1 * | 1/2007 | Poggio et al. | ................. | 434/185 |
| 7,209,577 B2 * | 4/2007 | McAlpine et al. | ............ | 382/118 |
| 7,342,587 B2 * | 3/2008 | Danzig et al. | ................. | 345/473 |
| 7,643,685 B2 * | 1/2010 | Miller | ........................... | 382/209 |
| 7,874,900 B2 * | 1/2011 | Ward et al. | ........................ | 463/9 |
| 2002/0069067 A1 * | 6/2002 | Klinefelter et al. | ........ | 704/270.1 |
| 2002/0135581 A1 | 9/2002 | Russell et al. | | |
| 2002/0161582 A1 * | 10/2002 | Basson et al. | ................. | 704/260 |
| 2004/0179037 A1 * | 9/2004 | Blattner et al. | ............... | 345/751 |
| 2004/0250210 A1 * | 12/2004 | Huang et al. | .................. | 715/706 |

(Continued)

FOREIGN PATENT DOCUMENTS

| EP | 1 420 366 | 5/2004 |
|---|---|---|
| EP | 1 460 588 | 9/2004 |
| WO | WO 98/59321 | 12/1998 |

(Continued)

*Primary Examiner* — Daniel Hajnik
*Assistant Examiner* — Andrew G Yang
(74) *Attorney, Agent, or Firm* — Preti Flaherty Beliveau & Pachios LLP (57) ABSTRACT

Dynamic animated avatars selectively morph to reveal or depict the user's identity while simultaneously emulating or tracking active movements associated with the user's verbal stream or perceived movements of the user. A user elects morphing to transition the rendered avatar to another, more revealing avatar, for example from a cartoon caricature to a posed photographic image. Animation processing identifies active movements derived from an input stream to compute animations of the mouth and profile based on speech, text, or captured video from the user. The computed animations appear as active movements to the currently rendered avatar, and emulate the user speaking or moving according to text, audio or video being transmitted. A user maintains an anonymous or posed identity with respect to the receiving party, and chooses to reveal a different avatar depicting a truer identity at the user's discretion, while continuing to display active movements paralleling the user's verbal activities.

24 Claims, 10 Drawing Sheets

U.S. PATENT DOCUMENTS

| | | | |
|---|---|---|---|
| 2004/0255304 A1* | 12/2004 | Ishikawa et al. | 719/318 |
| 2005/0038814 A1* | 2/2005 | Iyengar et al. | 707/104.1 |
| 2005/0039210 A1* | 2/2005 | Dusenberry et al. | 725/81 |
| 2005/0190188 A1* | 9/2005 | Anzawa et al. | 345/474 |
| 2005/0264527 A1* | 12/2005 | Lin | 345/156 |
| 2006/0023923 A1* | 2/2006 | Geng et al. | 382/116 |
| 2006/0206826 A1* | 9/2006 | Galanes et al. | 715/762 |
| 2008/0141175 A1* | 6/2008 | Sarna et al. | 715/848 |
| 2009/0237489 A1* | 9/2009 | Tsugane et al. | 348/14.12 |

FOREIGN PATENT DOCUMENTS

| | | |
|---|---|---|
| WO | WO 01/46947 | 6/2001 |
| WO | WO 03/071487 | 8/2003 |

* cited by examiner

Fig. 10

SMOOTH MORPHING BETWEEN PERSONAL VIDEO CALLING AVATARS

CLAIM TO BENEFIT OF EARLIER FILED PATENT APPLICATIONS

This invention claims the benefit under 35 U.S.C. 119(e) of the filing date and disclosure contained in Provisional Patent Application having U.S. Ser. No. 60/771,732, filed Feb. 9, 2006, entitled "SMOOTH TRANSITIONS (MORPHING) BETWEEN AVATARS AND PERSONAL IMAGES IN VIDEO CALLING (INTERACTIVE SESSION) APPLICATIONS", incorporated herein by reference.

BACKGROUND

With the advent of encoded video formats and video enabled personal communication devices, coupled with increasing network bandwidth for efficient video transport, video components for personal communications are becoming commonplace. Wireless phones are able to transmit and display a static image of a caller. Streaming video along with PC-cams enables live video to accompany Internet telephony transmissions. Electronic BBS (bulletin board systems) and chat rooms, once typically a text-only medium, now often provide a video identifier or even a dynamic thumbnail image of the orator. Such video images indicative of the source, or broadcasting user, are also known as avatars. Personal video avatars have now become commonplace for identifying participants in an electronic forum such as wireless calling, video calling, Internet chat rooms, so called "blog spots," and other vehicles for deriving personal input from a user of a communications device.

The use of video for telephony or other interactive sessions is becoming commonplace, especially involving mobile handsets. In some cases, a participant does not want to be seen as is, but wants to present some video image for other participants to see. Choosing to use an avatar as a representative is one alternative. Avatars can come in at least the following three forms:
 a cartoon image, possibly a caricature of the participant, or otherwise portraying characteristics representative of how the participant would like to be perceived,
 the image of some other individual, possibly a well known actor or character, and
 an image of the participant himself captured at a time when he was more presentable that he currently is.
User defined avatars may take photographic or fanciful forms, such as cartoons and caricatures (a representation of a person that is exaggerated for comic effect), or a mix of these, such as a .tif or .gif image electronically modified (i.e."photoshopped") to accentuate or add features. Procedures for lip syncing such avatars are also in use. In this process, the actual speech from the participant is analyzed in order to be able to compose mouth movements for the avatar that make it seem like the avatar is actually speaking the participant's words.

In other applications such as broadcast video or movies, morphing has been used as a special effect to convert from one facial image (initial) to a different facial image (final) using an image that is an interpolation between the other two. Over a period of time, the interpolation smoothly changes from mostly using the initial image to mostly using the final image to give the impression that the face itself is slowly changing from initial form to final form

SUMMARY

Conventional personal communication mediums often have a vehicle for insertion of a personal icon, such as a photograph or caricature, identifying the user. Animation of the personal icon may be provided by deriving mouth and head movements from text and video inputs. However, users may not want to employ the same icon in all contexts. Configurations herein are based, in part, on the observation that users are often tied to a predetermined icon, or avatar, throughout a session, and cannot block or supplement an image if they either want to suppress a true photographic identity or augment a fanciful cartoon icon with an actual picture. In some instances, such as a chat room, a user may wish to employ a cartoon or caricature image initially, and selectively reveal a true photographic image at a later time or to a specific recipient. Similarly, a wireless phone call may be accompanied by either a caricature image or live photograph depending on whether the caller wants to reveal a true visual identity. Further, such conventional icons may merely be static, unanimated images unaffected by the current transmission stream. Conventional personal icons suffer from the shortcoming that changing one's personal avatar often requires downloading a supplemental image and overwriting the old image with a new image. Further, such overwriting often requires an offline activity such as an option or utility, and cannot be seamlessly performed concurrently with a conversation or chat room session.

Configurations herein substantially overcome the shortcomings of conventional identifying icons or avatars by providing dynamic animated avatars that selectively morph to reveal or depict the user's identity while simultaneously emulating or tracking active movements associated with the user's verbal stream or perceived movements of the user. A user elects morphing to transition the displayed (rendered) avatar to another, more revealing avatar, for example from a cartoon caricature to a posed photographic image, or from a captured image to a live image. Animation processing identifies active movements derived from an input stream to compute animations of the mouth and profile (head angle) based on speech, text, or captured video from the user. The computed animations appear as active movements to the currently rendered avatar, whether it be a fanciful cartoon or captured photographic image, and emulate the user speaking or moving according to text, audio or video being transmitted. In this manner, a user may maintain an anonymous or posed identity with respect to the receiving party, and choose to reveal a different avatar depicting a truer identity at the user's discretion, while continuing to provide active movements to parallel the user's verbal and/or mechanical activities.

The claimed method combines the use of animated avatars and personal images during interactive video sessions with the use of morphing of images. A video session is initiated with an avatar used to represent a participant. During the session, the participant may decide to replace the avatar with either a different avatar, or with his actual image. Instead of having an abrupt transition between the two different images, the claimed method provides a more acceptable alternative that makes the transition occur gradually over time. The transition can be automated to occur over a fixed period of time after initial instigation by the participant. Alternatively, the transition can be handled in stages such that the changes to the apparent image halt midway between the initial and final states. Continued progress from one stage to the next might be at the option of, and controlled by, the participant (transmitting user).

In the system disclosed herein, a piece of communications equipment intercepts the video stream from the participant in order to replace the participant's image with that of an avatar. The intercepted audio from the participant is used in creating avatar lip motions. This same piece of equipment can be augmented to include the claimed method in supporting transitions between two avatars or between an avatar and the image of the participant. Two parallel video streams, matched frame by frame, are made available during the process. The initial stream is either that of the original participant, or that of an avatar after lip sync corrections have been applied. The final stream is either that of the original participant, or that of a different avatar also after lip sync corrections have been applied. The resultant video stream that is forwarded to other participants includes a frame by frame morphing which gradually changes from mostly representing the frames in the initial stream to mostly representing the frames in the final stream. Further, the disclosed functionality may be embedded in the user device, or other equipment in the delivery path to the user, to allow "retrofitting" such capability into deployed devices.

In further detail the method for rendering image data associated with a user as disclosed herein includes selecting a graphical rendition corresponding to a user, and receiving an indication of active movements applicable to the selected graphical rendition. The dynamic avatar generator renders the graphical rendition as a rendered image depicting the active movements, until receiving an initiator signal to transform the rendered image to a progressed image. At such a time, a morpher transitions the rendered image to the progressed image, while an animator maintains the active movements of the rendered image during the transitioning.

Such rendering depicting the active movements includes capturing expressive input via an input stream, and displaying the graphical rendition and animating the rendered image using the expressive input, in which the captured expressive input corresponds to facial features of spoken verbiage. Rendering depicts the active movements by emulating the user performing the speech conveyed by the expressive input, in which the expressive input is contained in an input stream including the indication of active movements.

An extractor performs feature extraction on the input stream to derive facial features, and thus derives, from the input stream, such facial features including a perspective angle and jaw movements corresponding to the spoken verbiage. The animator computes active movements from extracted audio features and video features from the input stream. The extracted features further comprise audio features and video features, and the animator applies the active animations to effect mouth, eye and profile appearances of the rendered image.

In the example configuration, the animated graphical rendition is a base avatar derived from a base image, such that transitioning includes selecting a second, transition base image corresponding to a transition avatar, and applying a set of changes to the rendered image such that the rendered image appears more like the transition avatar than the base avatar, thus morphing a first rendered image corresponding to the graphical rendition into a second rendered image.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein are based on the observation that users are often tied to a predetermined icon, or avatar, throughout an application or connection session, and cannot block or supplement an image if they either want to suppress a true photographic identity or augment a fanciful cartoon icon with an actual picture. Configurations herein substantially overcome the shortcomings of conventional avatars by providing dynamic animated avatars that selectively morph to reveal or depict the user's identity while simultaneously emulating or tracking active movements associated with the user's verbal stream or perceived movements of the user. A user selectively initiates a morphing operation to transition the displayed (rendered) avatar to an alternative avatar, for example from a cartoon caricature to a posed photographic image, or from a captured image to a live image.

Animation processing identifies active movements derived from an input stream to compute animations of the mouth and profile (head angle) based on speech, text, or captured video from the user. The computed animations appear as active movements to the currently rendered avatar, whether it be a fanciful cartoon or captured photographic image, and emulate the user speaking or moving according to text, audio or video being transmitted. In this manner, a user may initiate an anonymous or posed identity with respect to the receiving party, and choose to transition to a different avatar depicting a truer identity at the user's discretion, while continuing to provide active movements to parallel the user's verbal and/or mechanical activities.

Figure 1:
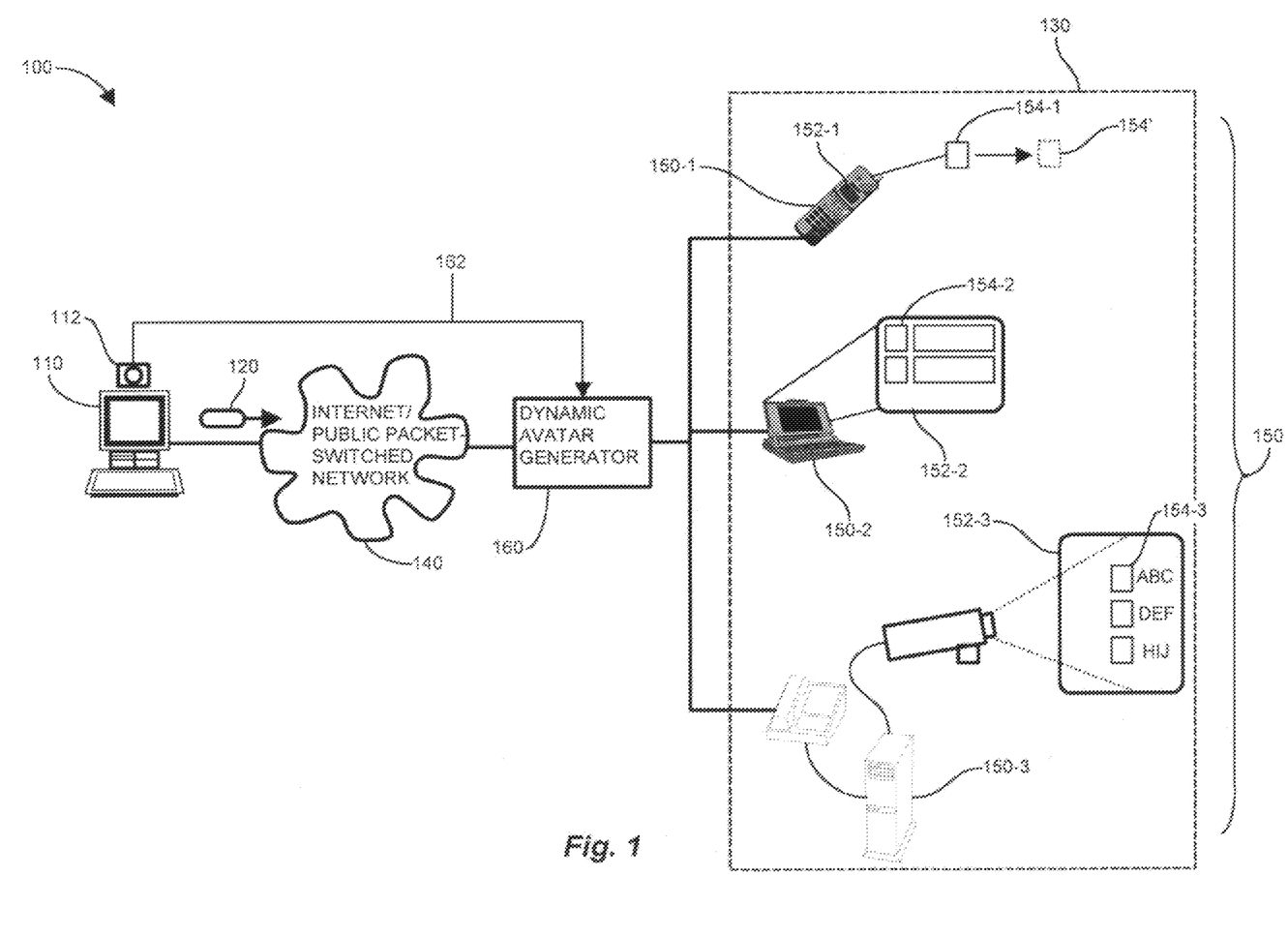
FIG. 1 is a context diagram of an exemplary video telephony environment having personal communications devices suitable for use with the present invention.

FIG. 1 is a context diagram of an exemplary video telephony environment 100 having personal communications devices suitable for use with the present invention. Referring to FIG. 1, a user 110 transmits a communication 120 to a remote user/recipient 130 via a public access network 140 such as the Internet. The communication 120 may be of any suitable type operable to be transported on the network 140, such as a packet or stream of packets in a packet switched network according to the well-known TCP/IP protocol. The communication 120 may therefore represent a single email, bbs or blog entry, VOIP voice call, streaming audio/video, or a combination of these.

The recipient 130 employs a personal communication device 150, such as a wireless phone 150-1, laptop/PC 150-2, or video conferencing unit 150-3, for example. The personal communications device 150 has a graphical display 152-1 . . . 152-3 (152 generally) operable to display an avatar 154-1 . . . 154-3 (154 generally), which is a graphical depiction or label corresponding to the initiating user 110. A dynamic avatar generator 160 is operable to render the avatar 154 on the graphical display 152. Rendering includes generating the avatar from an initial image, animating the avatar according to the user's 110 activity portrayed in the communication 120, and morphing the avatar into a second, transitioned avatar 154' at a user controlled time. The dynamic avatar generator 160 is responsive to the communication 120 and to a set of images 162, which may emanate from the user 110 or a separate repository, from which to generate the initial and transitioned avatars 154, 154'The images 162 are captured via a photographic device 112, or other graphical generation medium, such as in the case of cartoon or caricature images 162. As will be discussed further below, the dynamic avatar generator 160 changes, or morphs, the initial image 162 based avatar 154 into the transitioned avatar 154, based on a different image 162, such that only the initial avatar 154, transitioned avatar 154', or some transitional, partially morphed state in between is rendered on the display 152 at a particular time. The communication context is shown only in one direction for clarity; presumably each party to an exchange (user) may employ an avatar conversant device operable to receive and display avatars as discussed herein.

Figure 2:
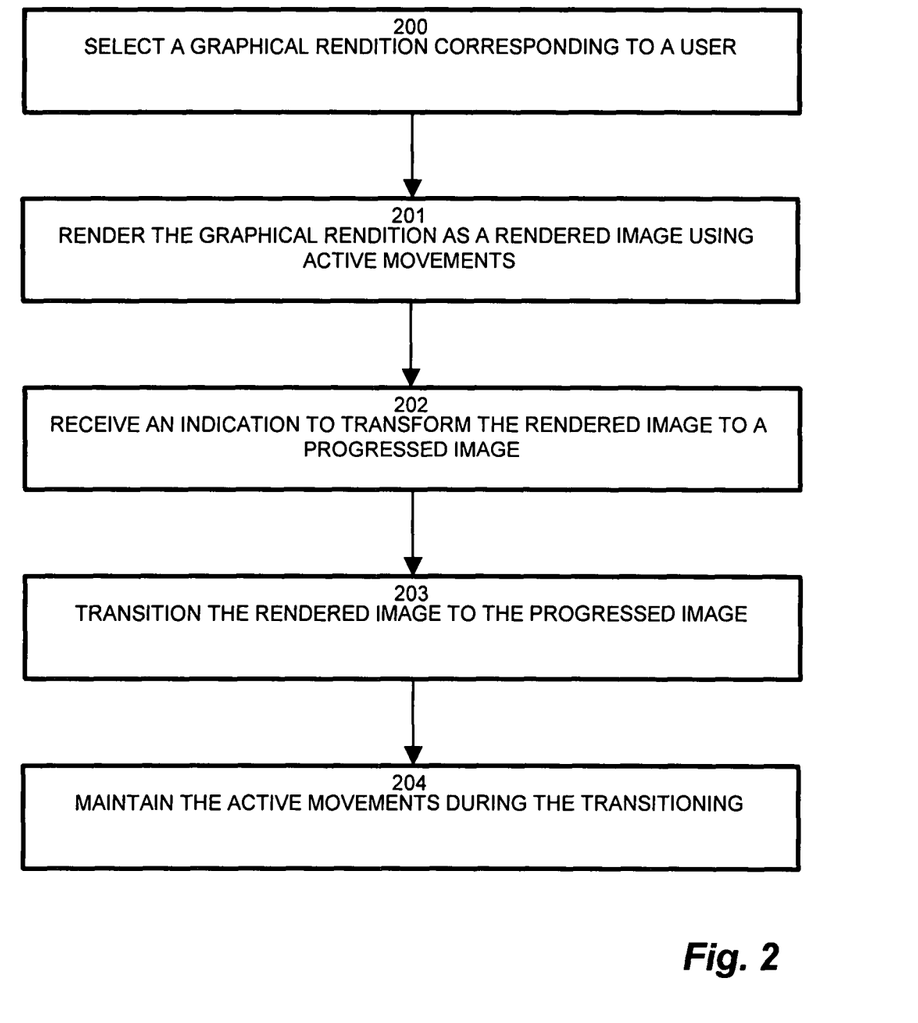
FIG. 2 is a flowchart of avatar morphing in the environment of FIG. 1.

FIG. 2 is a flowchart of avatar morphing in the environment of FIG. 1. Referring to FIGS. 1 and 2, the method for rendering image data associated with a user as defined herein includes selecting a graphical rendition corresponding to a user, as depicted at step 201, and rendering the graphical rendition as a rendered image using active movements, as shown at step 201. The graphical rendition may be any suitable image 162, such as a .gif or .tif file, or may be an arbitrary or fanciful rendition such as a cartoon or caricature. The rendition is also animated with active movements corresponding to speech, text, or other features (i.e. head movement) of the user 110, discussed further below. The initial rendering corresponds to the appearance the user 110 wants to display initially to other users that may not be well known. In other words, in an otherwise anonymous environment, a user may not wish to reveal a true photographic image until the recipient of the image is more well known or scrutinized. At some point in the exchange, an indication is received to transform the rendered image to a progressed image, as depicted at step 303, typically explicitly directed by the initiating user to begin the transformation. The system then transitions the rendered image to the progressed image, as disclosed at step 304. The progressed image is representative of the truer appearance that the user now wishes to reveal, after some exchange or feedback from the recipient, during which the system maintains the active movements through the transitioning.

Figure 3:
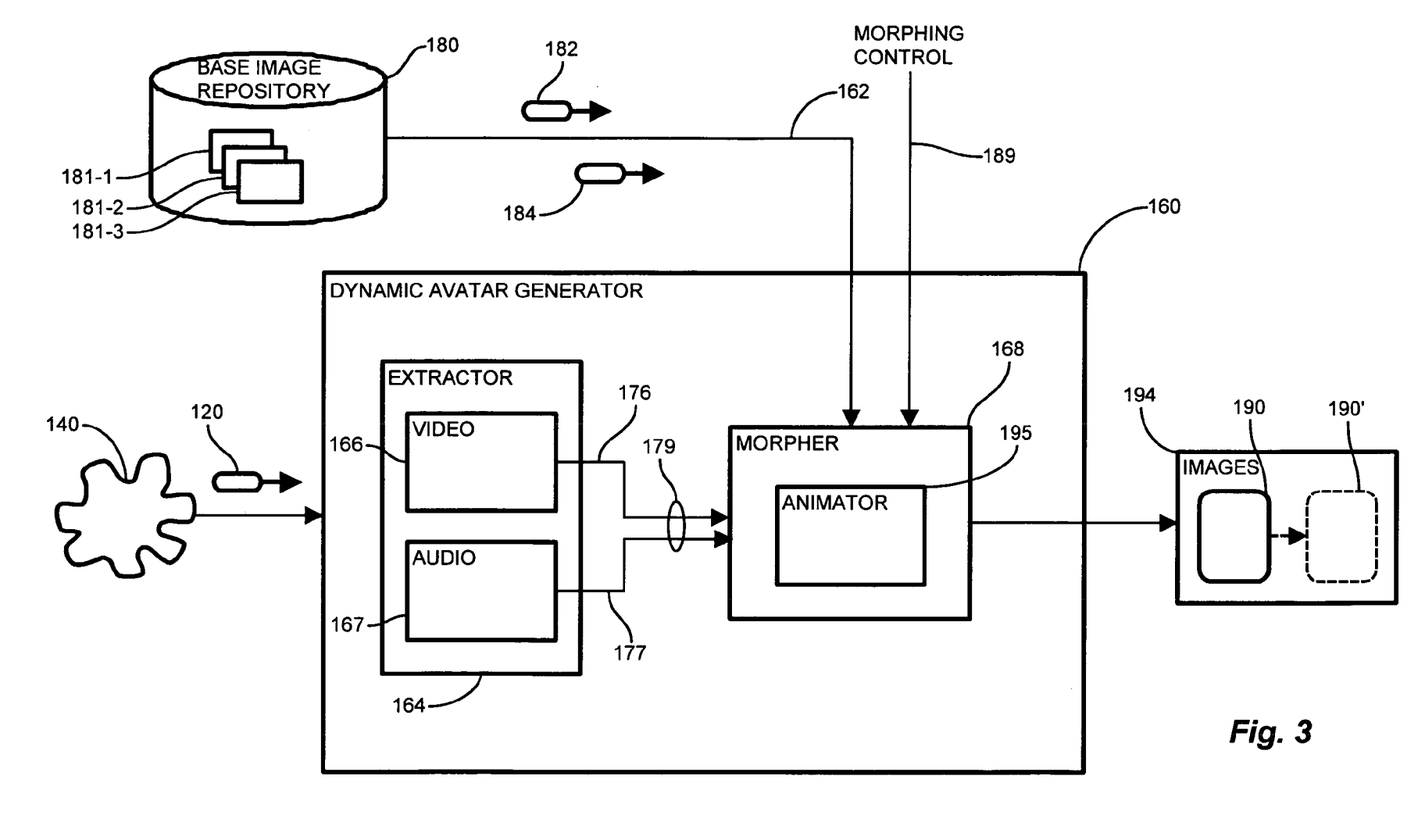
FIG. 3 is a block diagram of a communications device operable in conjunction with the configurations herein.

FIG. 3 is a block diagram of a communications device operable in conjunction with the configurations herein. Referring to FIGS. 1 and 3, the dynamic avatar generator 160 includes a feature extractor 164 (extractor) and a morpher 168. The extractor 164 includes a video extractor 166 for extracting video features, and an audio extractor 167 for extracting audio features. The morpher 168 receives the images 162 from a base image repository (repository) 180, which may emanate from the initiating user 110 or may be another data storage entity. The repository 180 stores static images 181-1 . . . 181-3 (181, generally), or base images, operable for selection by the user and for rendering and animation as disclosed herein. The morpher 168 receives the images 162 as an initial image 182 and a transitional image 184, and renders (generates) output images 190, 190' morphed from the initial image 182 to the transitional image 184, as disclosed herein. The dynamic avatar generator 160 renders the output images 190 on the display device 152 as avatars 154. It should be noted that the display device 152 generally includes both video and audio rendering features, however need only include one or the other, as verbal material may be output in a text or audible form.

Figure 4:
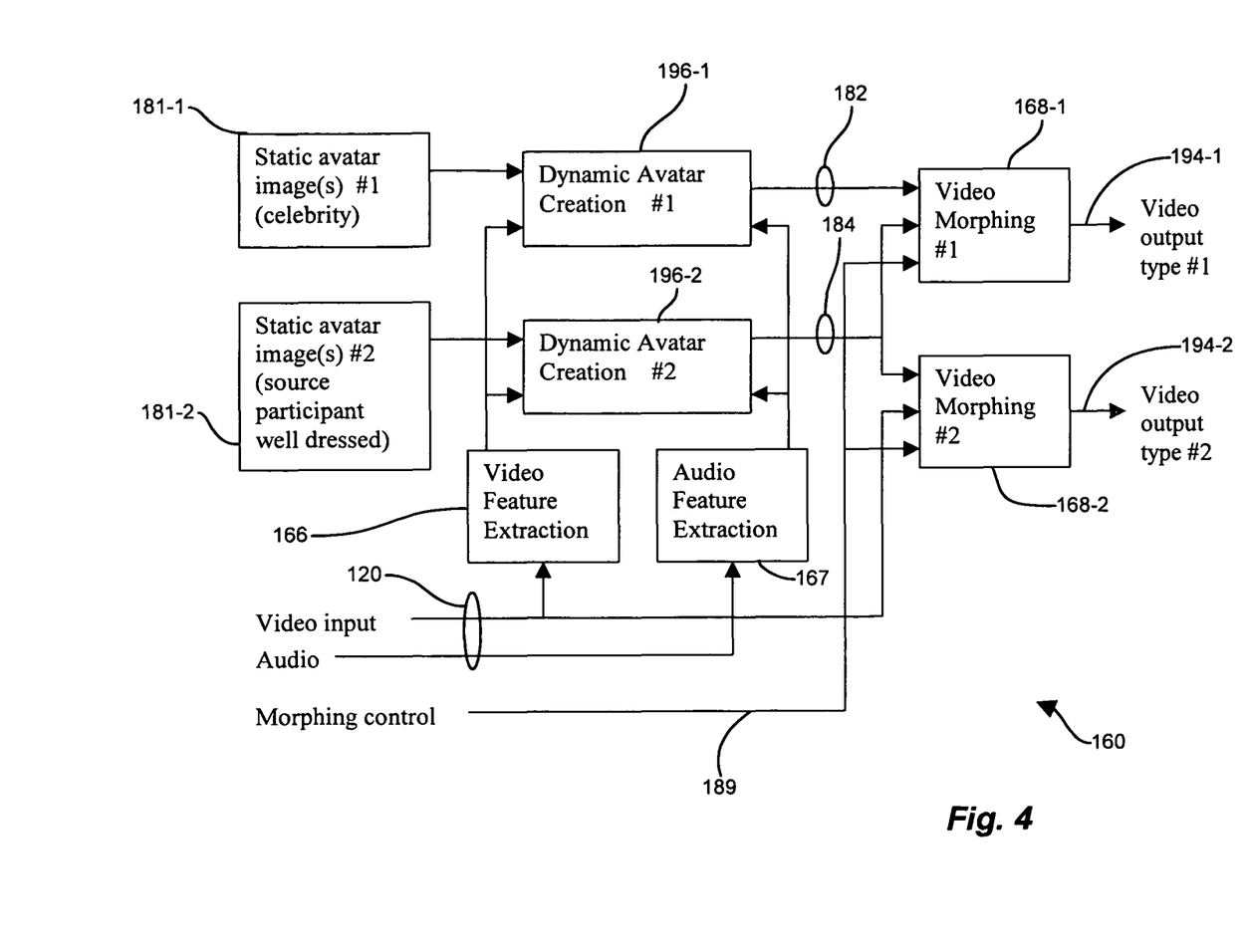
FIG. 4 is a block diagram of a video morphing configuration in a communications device as in FIG. 3.

FIG. 4 is a block diagram of an example video morphing configuration on a communications device as in FIG. 3. Referring to FIGS. 1, 3 and 4, the disclosed configuration may be implemented in the communications device 150 itself, or provided at a central location such as a switching office to support devices not natively equipped with such functionality. An example dynamic avatar generator 160 that supports two possible configurations of video avatar morphing applications is shown in FIG. 4. For a given single session or conversation, typically only a single type will be used. But for a system handling many simultaneous sessions, each session may independently choose which type is to be used. Additional configurations are possible as well, such as those that use a cartoon avatar image for one input. For base image type #1 181-1, the image of a chosen celebrity is morphed to become that of a pre-stored image of the source participant in a well dressed state. For type #2 181-2, a pre-stored image of the source participant in a well dressed state is morphed to become the actual image of the source participant at the time of the conversation.

The video morphing subsystem 168 creates an output video stream 194 composed of frames whose images are interpolated between the images on corresponding frames of the two input streams 181-1, 181-2. Morphing control 189 determines to what degree the output image 190 looks like one input stream versus the other. The term morphing generally indicates a process by which the degree changes gradually from frame to frame such that the overall output changes over a period of seconds from mostly resembling one input to mostly resembling the other input.

The object of the dynamic avatar creation subsystem 196-N in the animator 195 is to create a moving image 190 in which the size, head position, head motion, and lip motion of the avatar 154 match the size, head position, head motion, and lip motion of the source participant in the input video 162. In the example configuration, the animator 195 includes one or more dynamic avatar creators 196. For a given session, only one dynamic avatar creation subsystem 196 is needed if the other of the inputs 184 for the dynamic avatar generator 160 is the input video from the source participant himself. In some sessions, however, two dynamic avatar creation subsystems 196 may be needed to create two different avatars for the dynamic avatar generator 160 to use.

The dynamic avatar generator 160 stores or accesses static images 180 of all possible avatars 181. For a given avatar 181-N, there may in fact be multiple static images stored in order to best represent a wide range of head motion. Some avatar images (celebrities, cartoons) are global in that they may be shared by any of the source participants that will use the system. Other avatar images 181 are accurate representations of a particular source participant, and may only be made available to that source participant.

The object of the video feature extraction subsystem 166 is to identify head position in each frame of the input video from the source participant. Key features like eyes, nose, ears, chin, and hairline may be noted in coordinates relative to the full frame. These coordinates are then passed to the dynamic avatar creation subsystem 196 for use in similarly positioning the head of the avatar in each corresponding video frame.

The object of the audio feature extraction subsystem 167 is to identify vowel and consonant sounds in the speech of the source participant 110. These are then passed to the dynamic avatar creation subsystem 196 for use in generating proper lip motion for the avatar 190. An alternative to the use of an audio feature extraction subsystem 167 is simply to use the video feature extraction subsystem 166 to identify the lip position and motion of the source participant that is then reproduced in the avatar. However, nuances in lip position that might be hard to extract visually can be more accurately generated using a priori knowledge of the lip position needed to form certain vowel and consonant sounds.

In an example embodiment, the equipment that performs the avatar generation and morphing is the participant's terminal 110, at the source of the video stream 120. This terminal may be a personal computer or laptop, specialized wireline telephony terminal, or mobile telephony handset, and may include a video capture device 112, e.g. webcam.

Figure 5:
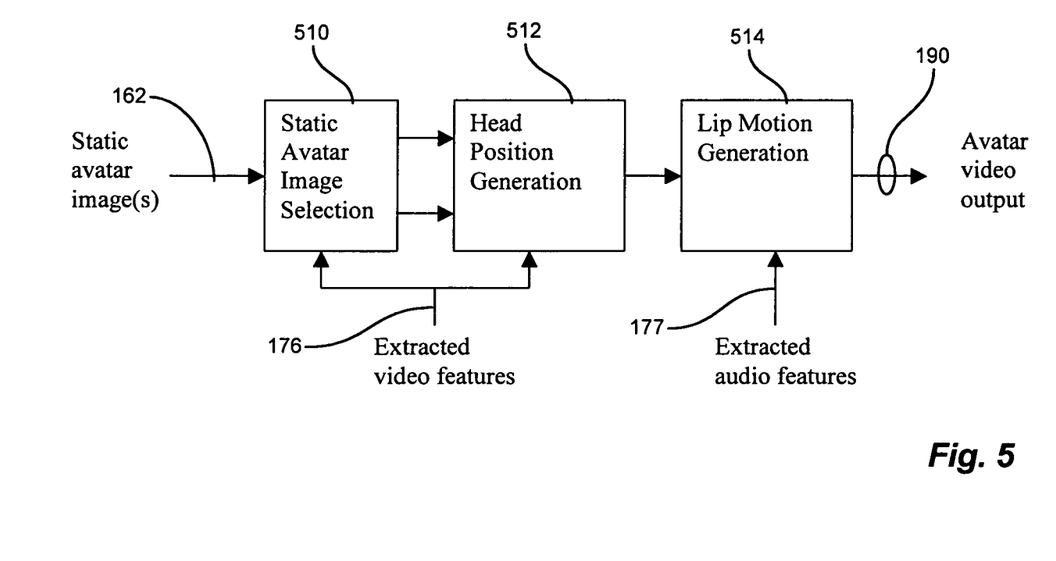
FIG. 5 is a block diagram of the avatar subsystem of FIG. 4.

FIG. 5 is a block diagram of the dynamic avatar creation subsystems 196-N of FIG. 4. The frame by frame processing of the dynamic avatar creation subsystem 196 is driven by the arrival of extracted video features 176. In this fashion, each frame of avatar output video will match a corresponding frame of input video from the source participant. Typically, there are more audio frames per second than video frames per second, so the processing of each frame will simply use the most recently reported extracted audio features 177.

The video features 176 are first used to determine an overall head position and orientation that is used by static avatar image selection 510. Typically, two static images might be selected such that the current head position indicated by video features lies between the two. The exact positions indicated by various video features are then used by head position generation 512 to interpolate or extrapolate from the static images so as to produce a frame in which the generated avatar image is repositioned correctly. Finally, lip motion generation 514 consults a table of mouth positions based on various vowel and consonant sounds to superpose a new lip position upon the generated avatar image.

In an alternate implementation, the order of the above subsystems might be reversed. A single front facing static image of the avatar might first be accessed, and lip motion generation 514 applied to generate proper lip position. Then the video features 176 could be used by head position generation 512 to move and rotate the result into the correct head position.

Figure 6:
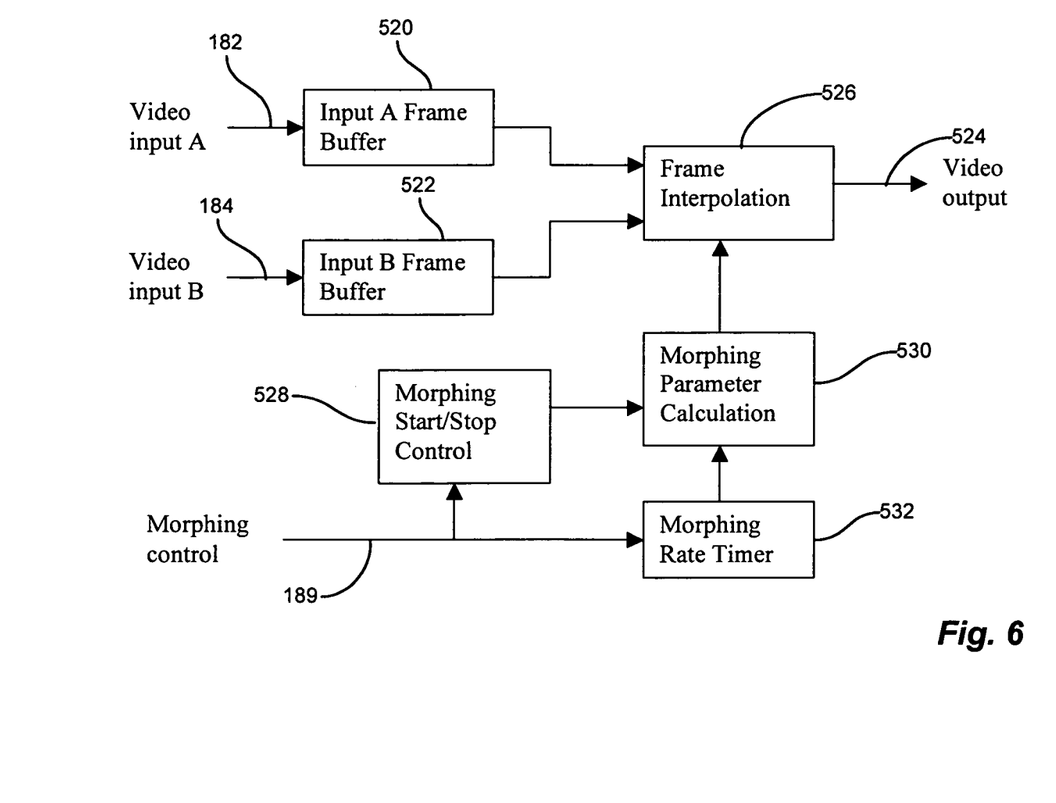
FIG. 6 is a block diagram of the video morphing subsystem of FIG. 4.
Figure 7:
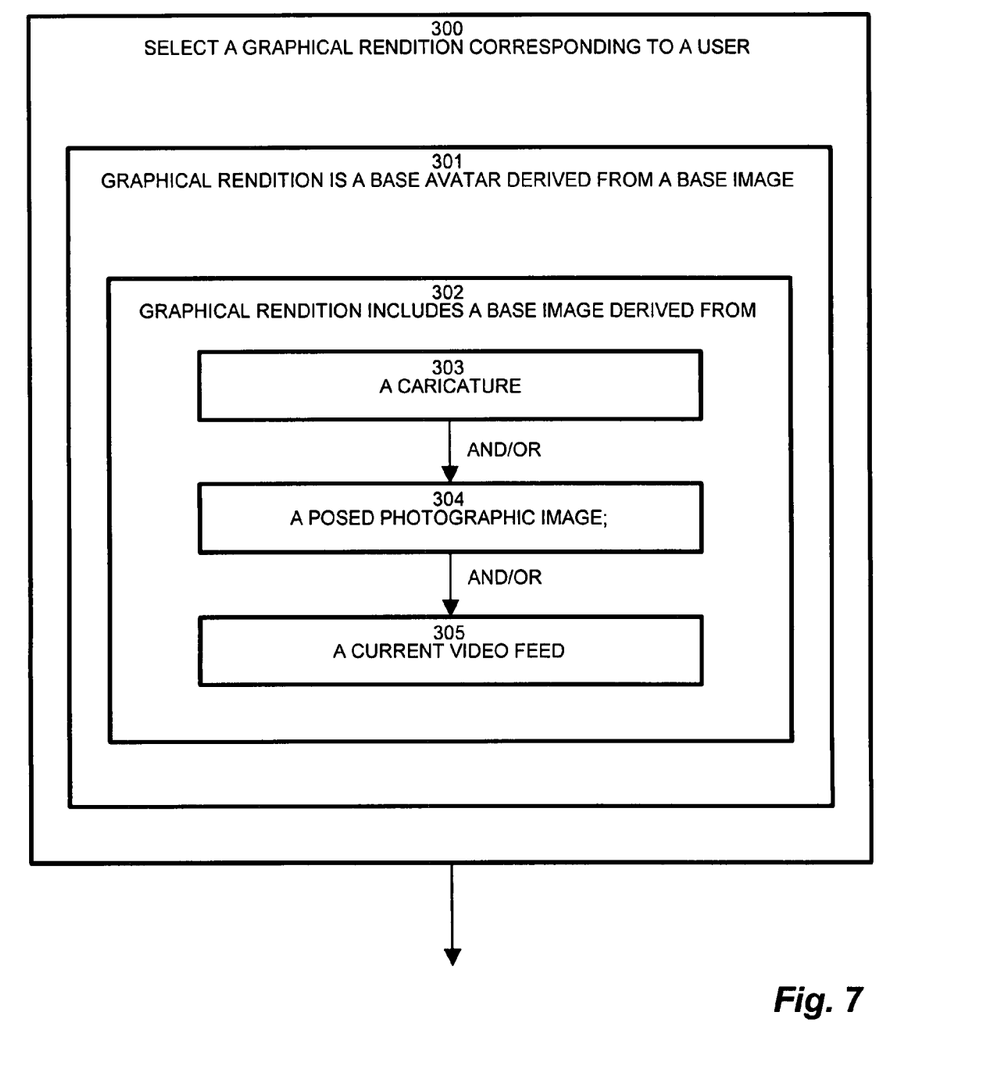
FIGS. 7-10 are a flowchart of avatar morphing as disclosed herein.
Figure 8:
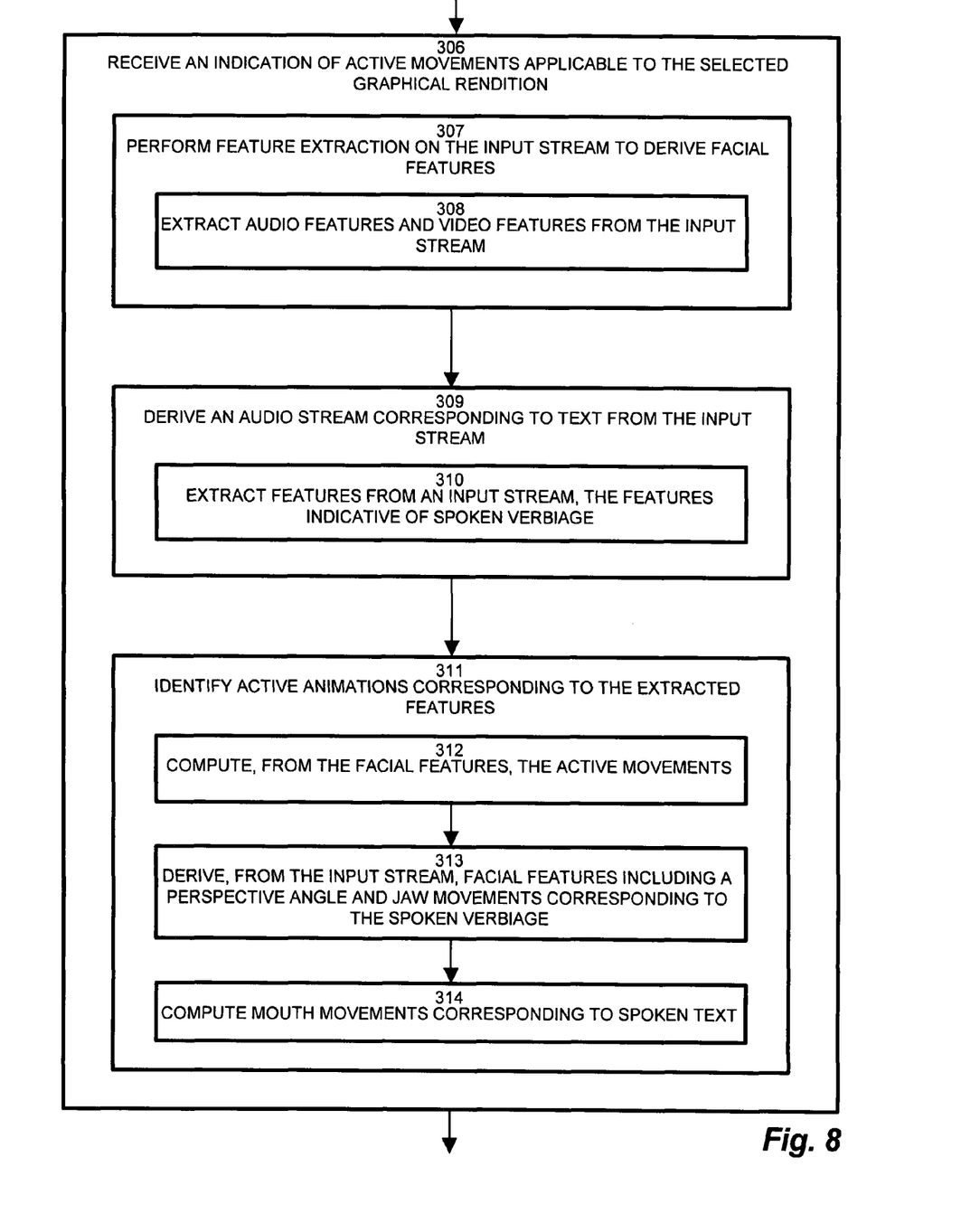
Figure 9:
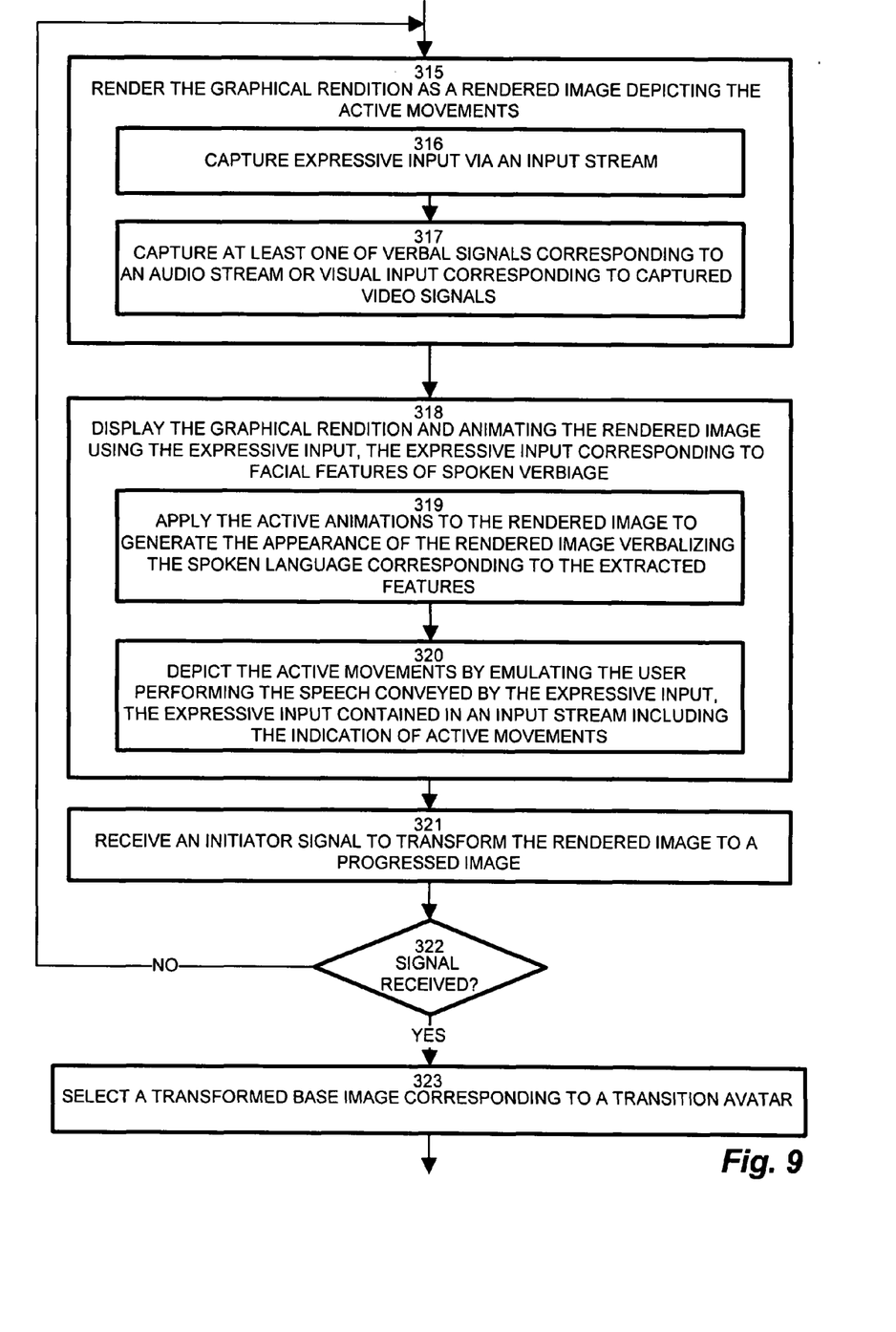
Figure 10:
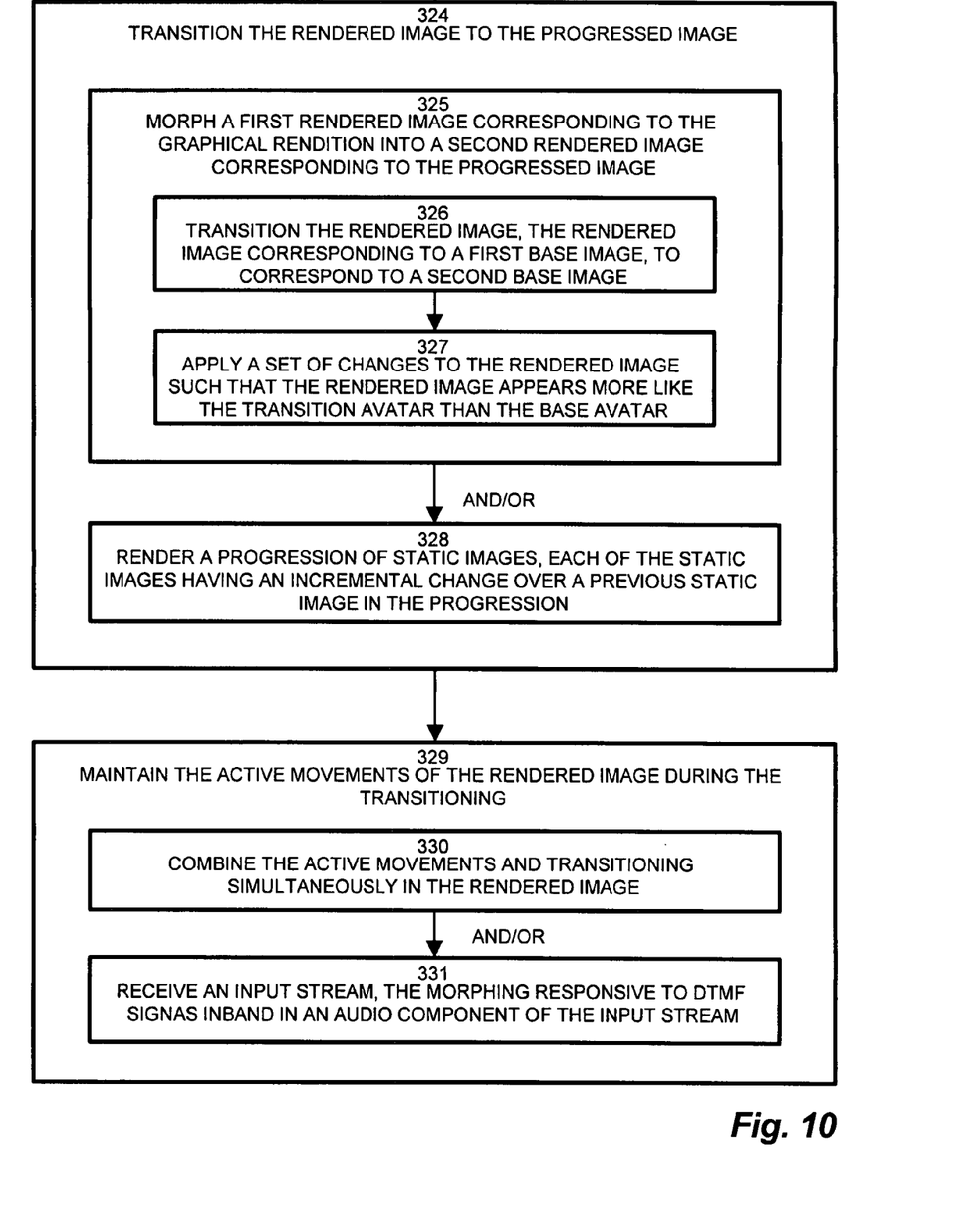

FIG. 6 is a block diagram of the video morphing subsystem 168 of FIG. 4. The remainder of the dynamic avatar generator 160 system has ensured that frames will arrive at both video inputs 182, 184 of the video morphing subsystem 168 at nearly the same time (within a small fraction of a frame period). When a frame is available in both input buffers 520, 522, the processing of a single corresponding video output frame 524 will be done. Furthermore, at this point the frames at both inputs 520, 522 will have the same head and lip positions. frame interpolation 526 can therefore perform simpler pixel by pixel mixing instead of more complex feature based interpolation. In an alternate implementation, however, frame interpolation 526 continues with a feature based interpolation, as used previously in the dynamic avatar creation subsystem 196, in order to create a smoother blend of the two disparate images.

The source participant (user device 110) has ultimate control of how and when the morphing is used. At a higher level (not shown), the source participant may previously have selected which initial avatar 182 to use, and which type of morphing to apply (which final avatar or image to use). Dynamically during the conversation, the source participant 110 may indicate using morphing control 189 when to start 528 the process of converting the image from one input source to the other; and may stop or even reverse the morphing process with subsequent control. A wide variation in rate of conversion may be selected as well; from 'change quickly within a few seconds', to 'reveal only gradually over a period of minutes'. Initially, a morphing parameter calculation 530 starts with the selection of all of one video input 520, 522 (and none of the other). Once morphing has begun, the real time rate of change indicated by the timer 532 is combined with the noted video frame rate to determine a new parameter for each frame, only slightly changed from the parameter used for the previous frame.

In another configuration, the equipment is in the network and may also be serving as a gateway to help connect the participant's terminal 150-2 to the network, or as a video portal to help support other video applications on the participant's terminal. In other configurations, the equipment is a multimedia conferencing unit 150-3 offering conferencing services to all participants. The avatar generation and morphing is offered as one of many conferencing features.

In a particular application, a participant initiates a video conversation in an environment in which he(she) would like to remain relatively anonymous, such as a dating chat room. The initial avatar presented 190 will be either of the cartoon variety, or an image of a different person (celebrity). After transition to a one on one conversation and becoming sufficiently comfortable talking with another individual, the participant may decide to let the other individual see his(her) actual features—perhaps very gradually. The transition may be to an actual image 190' of the participant, or to another avatar 154 created from an ideal image 184 of the participant.

FIGS. 7-10 are a flowchart of avatar morphing as disclosed herein. Referring to FIGS. 3 and 7-10, the method for rendering image data associated with a user as disclosed herein includes selecting a graphical rendition corresponding to a user, as depicted at step 300. In the example configuration shown, the graphical rendition corresponds to a base avatar 181 derived from a base image 162, as shown at step 301. At step 302, the graphical rendition encompasses a base image

162 including at least one of a caricature, as depicted at step 303, a posed photographic image, as shown at step 304, or a current video feed, as disclosed at step 305. A caricature may be a fanciful cartoon image selected by the user, such as a favorite character, or other generated or captured graphic. The posed photographic image is typically expected to be a previously captured photographic image, such as a .gif or .tif, and the current video feed is a more casual live or nearly live image, such as from a web cam. The animations, discussed further below, may be derived from this live feed, from verbal or textual language, or from both.

The rendered avatar 154 includes dynamic features of the user image 162 according to speech, text, captured video, or a combination. Accordingly, the dynamic avatar generator 160 receives an indication of active movements applicable to the selected graphical rendition, as shown at step 306. Such capture includes, at step 307, applying feature extraction to the input stream 120, such that performing feature extraction on the input stream derives facial features, as disclosed at step 308. Extracting includes extracting audio features 177 and video features 176 from the input stream 120, as disclosed at step 308.

The extractor 164 derives an audio stream of audio features 177 corresponding to text from the input stream 120, as depicted at step 309, such that the extracted features are indicative of spoken verbiage, as disclosed at step 310. The verbiage is employed to provide animations of the avatar through mouth, eye and head movements. The extractor 164 identifies such active animations corresponding to the extracted features 176, 177, as shown at step 311, which includes computing, from the facial features, the active movements, depicted at step 312, and deriving, from the input stream, facial features including a perspective angle and jaw movements corresponding to the spoken verbiage, as disclosed at step 313. The extractor 164 then computes mouth movements corresponding to spoken text, as depicted at step 314. The avatar 154 is therefore animated by computing the applicable graphical output to provide the avatar the appearance of speaking the text reflected in the input stream 120.

The dynamic avatar generator 160 renders the graphical rendition as a rendered image 190 depicting the active movements, as disclosed at step 315. Such rendering depicting the active movements further includes capturing the expressive input via an input stream 120, as shown at step 316, including capturing at least one of verbal signals corresponding to an audio stream 177 or visual input corresponding to captured (extracted) video signals 176, shown at step 317. The resulting signals 176, 177 allow for displaying the graphical rendition and animating the rendered image using the expressive input, in which the expressive input corresponds to facial features of spoken verbiage from the input stream 120, as depicted at step 318. Displaying includes applying the active animations to the rendered image 190 to generate the appearance of the rendered image verbalizing the spoken language corresponding to the extracted features 179. Rendering further includes depicting the active movements by emulating the user performing the speech conveyed by the expressive input, the expressive input contained in an input stream including the indication of active movements, as shown at step 320.

In the typical exchange, such as a phone call, chat room, or video conference, the transmitting/initiating user 110 portrayed in the rendered avatar 154 elects to transition to another (presumably more revealing) avatar. At some point in the rendering, the dynamic avatar generator 160 receives an initiator signal 189 to transform the rendered image 190 to a progressed image 190', as shown at step 321. A check is performed, at step 322, and animation continues as disclosed above until the initiator signal 189 is received, and animation continues as shown from step 315.

Upon receiving the signal 189, the morpher 168 selects a transformed base image 184 corresponding to a transition avatar 181-N, as shown at step 323, and transitions the rendered image 190 to the progressed image 190', depicted at step 324. Transitioning involves morphing the first rendered image 190 corresponding to the graphical rendition 182 into a second rendered image 190' corresponding to the progressed, or transition, image 184 drawn from the base avatars 181, shown at step 325. Morphing includes, therefore, transitioning the rendered image 190, the rendered image corresponding to a first base image 182, to correspond to a second base image 184, as depicted at step 326. Accordingly, the morpher 168 applies a set of changes to the rendered image 190 such that the rendered image 190' appears more like the transition avatar 181-N than the base avatar 181-1. Alternatively, transitioning may include rendering a progression of static images 181-N, each of the static images having an incremental change over a previous static image in the progression, thus using a sequence of similarly posed but having differential appearance of the animated features such as the mouth, eyes, and head, as depicted at step 328.

The morpher 168 maintains the active movements 179 of the rendered image 190 during the transitioning by continuing to receive the extracted features 176, 177 from the extractor, as disclosed at step 329, thus combining the active movements and transitioning simultaneously in the rendered image 190, as disclosed at step 330. In the example configuration, morphing includes receiving an input stream 120 such that the morphing is responsive to DTMF signals inband in an audio component of the input stream, as depicted at step 331, in which the extracted features further comprise audio features 177 and video features 176, and further includes applying active animations to effect mouth, eye and profile appearances of the rendered image, as described above.

Those skilled in the art should readily appreciate that the programs and methods for rendering image data associated with a user as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for rendering image data associated with a user has been particularly shown and described with references to embodiments thereof, it will be understood by those skilled in the art that various changes in form and details may be made therein without departing from the scope of the invention encompassed by the appended claims.

What is claimed is:

1. A computer implemented method for generating image data associated with a user comprising:
   selecting a graphical rendition corresponding to a user that obscures a visual identity of the user;
   receiving an indication of active movements applicable to the selected graphical rendition and applicable to the progressed image;
   rendering the graphical rendition in each frame of a first series of image frames as a rendered image depicting the active movements;
   selecting a progressed image that is more revealing of the visual identity of the user than the graphical rendition;
   receiving an initiator signal provided by the user to begin transforming the rendered image to the progressed image;
   in response to receipt of the user-provided initiator signal, generating the progressed image depicting the active movements in each frame of a second series of image frames concurrently with the first series of image frames;
   further in response to the user-provided initiator signal, generating a third series of image frames depicting the active movements, each frame in the third series of image frames being generated by combining a frame from the first series of image frames depicting the active movements with a corresponding frame from the second series of image frames depicting the active movements, where the combining is performed by progressive interpolation to cause the third series of image frames to progress from the rendered image to the progressed image while maintaining the active movements; and
   rendering the third series of image frames.

2. The method of claim 1 wherein rendering the graphical rendition in each frame of a first series of image frames as a rendered image depicting the active movements further comprises:
   capturing expressive input via an input stream; and
   displaying the graphical rendition and animating the rendered image with the first series of image frames using the expressive input, the expressive input corresponding to facial features of spoken verbiage.

3. The method of claim 2 wherein rendering the graphical rendition in each frame of a first series of image frames as a rendered image depicting the active movements further comprises depicting the active movements by emulating the user performing the speech conveyed by the expressive input, the expressive input contained in an input stream including the indication of active movements.

4. The method of claim 3 further comprising:
   performing feature extraction on the input stream to derive facial features;
   deriving, from the input stream, facial features including a perspective angle and jaw movements corresponding to the spoken verbiage; and
   computing, from the facial features, the active movements.

5. The method of claim 2 wherein capturing expressive input via the input stream includes:
   applying feature extraction to an input stream;
   deriving an audio stream corresponding to text from the input stream; and
   computing mouth movements corresponding to spoken text.

6. The method of claim 1 wherein generating the progressed image further comprises:
   selecting a transition image that is more revealing of the visual identity of the user than the graphical rendition;
   capturing expressive input via an input stream; and
   applying the expressive input to the transition image to form the progressed image in each frame of the second series of image frames.

7. The method of claim 6 wherein combining by progressive interpolation further comprises morphing the rendered image depicting the active movements corresponding to the graphical rendition into another rendered image corresponding to the progressed image.

8. The method of claim 7 wherein morphing the rendered image corresponding to the graphical rendition into another rendered image corresponding to the progressed image includes transitioning the rendered image, the rendered image corresponding to a first base image, to correspond to a second base image.

9. The method of claim 8 wherein the morphing the rendered image corresponding to the graphical rendition into another rendered image corresponding to the progressed image includes responding to DTMF signals in band in an audio component of the input stream.

10. The method of claim 2 wherein capturing expressive input via an input stream includes capturing at least one of verbal signals corresponding to an audio stream or visual input corresponding to captured video signals.

11. The method of claim 10 wherein combining by progressive interpolation further comprises rendering a progression of static images, each of the static images including an incremental change over a previous static image in the progression.

12. The method of claim 11 wherein the graphical rendition is a base image including at least one of:
    a caricature; and
    a posed photographic image; or a current video feed.

13. The method of claim 1 wherein depicting the active movements further comprises:
    extracting features from an input stream, the features indicative of spoken verbiage;
    identifying active animations corresponding to the extracted features; and
    applying the active animations to the rendered image to generate the appearance of the rendered image verbalizing the spoken language corresponding to the extracted features.

14. The method of claim 13 wherein extracting features from the input stream further comprises:
    extracting audio features and video features from the input stream, wherein the extracted features further comprise audio features and video features, further comprising applying active animations to affect mouth, eye and profile appearances of the rendered image.

15. A communications device for generating image data associated with a user comprising:
    at least one processor;
    an interface to a base image repository being operable to provide to the base image repository a selection of a graphical rendition corresponding to a user that obscures a visual identity of the user;
    a selection interface being operable to permit selection of a progressed image that is more revealing of the visual identity of the user than the graphical rendition;
    an extractor operable to receive an indication of active movements applicable to the selected graphical rendition and to the selected progressed image;
    an animator operable to render the graphical rendition in each frame of a first series of image frames as a rendered image depicting the active movements, and being further operable to be responsive to an initiator signal provided by the user to generate the progressed image depicting the active movements in each frame of a second series of image frames concurrently with the first series of image frames; and a morpher operable to be responsive to the user-provided initiator signal to generate a third series of image frames depicting the active movements, each frame in the third series of image frames being generated by combining a frame from the first series of image frames depicting the active movements with a corresponding frame from the second series of image frames depicting the active movements, where the combining is performed by progressive interpolation to cause the third series of image frames to progress from the rendered image to the progressed image while maintaining the active movements.

16. The device of claim 15 wherein the extractor is further operable to:

capture expressive input via an input stream; the animator being responsive to the extractor and operable to display the graphical rendition and animate the rendered image with the first series of image frames using the expressive input, the expressive input corresponding to facial features of spoken verbiage.

17. The device of claim 16 wherein the animator is further operable to:

depict the active movements by emulating user performing the speech conveyed by the expressive input, the expressive input contained in the input stream including the indication of active movements.

18. The device of claim 17 wherein the extractor is further operable to:

perform feature extraction on the input stream to derive facial features;

derive, from the input stream, facial features including a perspective angle and jaw movements corresponding to the spoken verbiage; and compute, from the facial features, the active movements.

19. The device of claim 16 wherein the extractor further comprises an audio feature extractor operable to:

apply feature extraction to the input stream;

derive an audio stream corresponding to text from the input stream; and compute mouth movements corresponding to spoken text, further including a video feature extractor operable to extract video features from the input stream; wherein the extracted features further comprise audio features and video features, the video feature extractor being further operable to apply active animations to affect mouth, eye and profile appearances of the rendered image.

20. The device of claim 15 wherein the morpher is further operable to:

receive a selection of a transition avatar that is more revealing of the visual identity of the user than the graphical rendition;

capture expressive input via an input stream; and apply the expressive input to the transition avatar to form the progressed image in each frame of the second series of image frames.

21. The device of claim 20 wherein the morpher is further operable respond to DTMF signals in band in an audio component of the input stream.

22. The device of claim 16 wherein the extractor further includes an audio feature extractor and a video feature extractor, the audio feature extractor being operable to capture verbal signals corresponding to an audio stream, the video feature extractor operable to capture visual input corresponding to captured video signals.

23. A computer program product having a non-transitory computer readable medium operable to store a set of encoded instructions for execution by a processor responsive to the instructions for generating image data associated with a user, the set of encoded instructions comprising:

computer program code for selecting a graphical rendition corresponding to a user that obscures a visual identity of the user;

computer program code for capturing expressive input via an input stream;

computer program code for rendering the graphical rendition as a rendered image using the expressive input in each frame of a first series of image frames, the expressive input corresponding to facial features of spoken verbiage;

computer program code for selecting a progressed image that is more revealing of the visual identity of the user than the graphical rendition;

computer program code for receiving an indication provided by the user to transform the rendered image to the progressed image;

computer program code for responding to receiving the indication by generating the progressed image using the expressive input in each frame of a second series of image frames concurrently with the first series of image frames;

computer program code for responding to receiving the indication by generating a third series of image frames that maintain the usage of the expressive input, each frame in the third series of image frames being generated by combining a frame from the first series of image frames with a corresponding frame from the second series of image frames, where the combining is performed by progressive interpolation to generate a progression of resulting morphed image frames that maintain the usage of the expressive input while gradually transforming the rendered image to the progressed image; and computer program code for rendering the progression of resulting morphed image frames.

24. The device of claim 15 wherein the morpher is further operable to:

receive extracted features from an input stream, the extracted features being indicative of spoken verbiage;

identify active animations corresponding to the extracted features; and apply the active animations to the rendered image to generate an appearance of the rendered image verbalizing the spoken verbiage corresponding to the extracted features.

* * * * *